US010458524B2

(12) United States Patent
Hehenberger (10) Patent No.: US 10,458,524 B2
(45) Date of Patent: Oct. 29, 2019

(54) DRIVE TRAIN AND METHOD FOR OPERATING A DRIVE TRAIN

(71) Applicant: Gerald Hehenberger, Klagenfurt (AT)

(72) Inventor: Gerald Hehenberger, Klagenfurt (AT)

( * ) Notice: Subject to any disclaimer, the term of this patent is extended or adjusted under 35 U.S.C. 154(b) by 0 days.

(21) Appl. No.: 15/539,056

(22) PCT Filed: Dec. 22, 2015

(86) PCT No.: PCT/AT2015/000162
§ 371 (c)(1),
(2) Date: Jun. 22, 2017

(87) PCT Pub. No.: WO2016/100991
PCT Pub. Date: Jun. 30, 2016

(65) Prior Publication Data
US 2017/0343082 A1    Nov. 30, 2017

(30) Foreign Application Priority Data

Dec. 22, 2014    (AT) .................. A 930/2014

(51) Int. Cl.
*F16H 61/66* (2006.01)
*F16H 3/72* (2006.01)
(Continued)

(52) U.S. Cl.
CPC ............. *F16H 3/724* (2013.01); *F16H 61/66* (2013.01); *H02P 3/20* (2013.01); *H02P 5/753* (2013.01);
(Continued)

(58) Field of Classification Search
CPC ..... Y10T 477/23; F16H 3/724; F16H 61/866; F16H 61/12; F16H 3/727;
(Continued)

(56) References Cited

U.S. PATENT DOCUMENTS

| 5,714,851 | A | * | 2/1998 | Antony | .................. B60L 3/003 318/148 |
| 9,920,745 | B2 | * | 3/2018 | Fortmann | ............... F03D 7/043 |

(Continued)

FOREIGN PATENT DOCUMENTS

| AT | 507 394 A2 | 4/2010 |
| CN | 38 2 03597 U | 10/1988 |

(Continued)

OTHER PUBLICATIONS

International Search Report, dated Apr. 26, 2016, from corresponding PCT application No. PCT/AT2015/000162.
(Continued)

*Primary Examiner* — Roger L Pang
(74) *Attorney, Agent, or Firm* — Young & Thompson (57) ABSTRACT

Disclosed is a drive train including a drive shaft, a drive machine, and a planetary gearbox having three drives and three outputs, wherein one output is connected to the drive shaft, one drive is connected to the drive machine, and a second drive is connected to an electric differential drive. The differential drive can be connected directly to a network without a frequency converter, in order that the operation of the drive train is possible without a frequency converter.

9 Claims, 5 Drawing Sheets

(51) Int. Cl.
*H02P 25/20* (2006.01)
*H02P 3/20* (2006.01)
*H02P 5/753* (2006.01)
*H02P 27/06* (2006.01)
*F16H 61/12* (2010.01)

(52) U.S. Cl.
CPC .............. *H02P 25/20* (2013.01); *H02P 27/06* (2013.01); *F16H 3/727* (2013.01); *F16H 61/12* (2013.01); *F16H 2061/6602* (2013.01); *Y02E 10/723* (2013.01); *Y10T 477/23* (2015.01)

(58) Field of Classification Search
CPC .. F16H 2061/6602; H02P 27/06; H02P 25/20; H02P 5/723; H02P 3/20; Y02E 10/723
USPC ........................................................ 475/150
See application file for complete search history.

(56) References Cited

U.S. PATENT DOCUMENTS

| | | | | |
|---|---|---|---|---|
| 2007/0286731 | A1* | 12/2007 | Dantlgraber | F03D 7/0224 416/162 |
| 2011/0229324 | A1 | 9/2011 | Hehenberger | |
| 2012/0115661 | A1* | 5/2012 | Hehenberger | F03D 15/10 475/5 |
| 2012/0126628 | A1* | 5/2012 | Bjerknes | F03D 7/0224 307/84 |
| 2015/0198145 | A1* | 7/2015 | Diedrichs | F03D 7/04 700/287 |
| 2015/0333501 | A1* | 11/2015 | Geisler | F03D 7/0272 322/21 |

FOREIGN PATENT DOCUMENTS

| | | |
|---|---|---|
| CN | 1033913 A | 7/1989 |
| CN | 101212197 | 7/2008 |
| CN | 101976998 A | 2/2011 |
| DE | 3510799 A1 | 9/1986 |
| DE | 37 41 762 A1 | 5/1989 |
| DE | 195 02 224 C1 | 2/1996 |
| GB | 2 172 879 A | 10/1986 |
| WO | 2005/074120 A1 | 8/2005 |
| WO | 2012/001138 A2 | 1/2012 |
| WO | 2013/149639 A1 | 10/2013 |
| WO | 2014/183139 A1 | 11/2014 |
| WO | 2014/183142 A1 | 11/2014 |

OTHER PUBLICATIONS

Austrian Search Report, dated Aug. 27, 2015, from corresponding AT application No. A 930/2014.
Chinese Office Action for Application No. 201580070130.5 dated Apr. 30, 2019 with English translation provided.

* cited by examiner

DRIVE TRAIN AND METHOD FOR OPERATING A DRIVE TRAIN

BACKGROUND OF THE INVENTION

Field of the Invention

The invention relates to a drive train with a drive shaft, a drive machine, and with a differential gear unit with three drives and outputs, one output being connected to the drive shaft, one drive being connected to the drive machine, and a second drive being connected to an electrical differential drive.

The invention furthermore relates to a method for operating a drive train with one drive shaft, one drive machine, and with a differential gear unit with three drives and outputs, one output being connected to the drive shaft, one drive being connected to the drive machine, and a second drive being connected to an electrical differential drive.

Description of the Related Art

A frequently imposed demand on driven machines, such as conveyor equipment, for example pumps, compressors and fans, or such as mills, crushers, vehicles, or such as energy extraction facilities, etc., is a more efficient, variable-speed operation.

Furthermore, electrical machines are used as an example for drive machines used in this connection, but the principle applies to all types of drive machines, such as, for example, to internal combustion engines.

The most frequently used electrical drives are currently three-phase machines, such as, for example, asynchronous motors and synchronous motors. In order to be able to operate in a variable-speed manner, they are linked in combination with a frequency inverter to an electrical system. Variable-speed operation of the drive can be implemented with it, but the solution is expensive and associated with major adverse effects on efficiency.

A comparatively more economical alternative that is also better with respect to efficiency is the use of differential systems—for example according to AT 507 394 A. The heart of a differential system is a differential gear unit, which in one simple embodiment is a simple planetary gearing stage with three drives and outputs, one output being connected to the drive shaft of a driven machine, a first drive being connected to the drive machine, and a second drive being connected to a differential drive. Thus, the driven machine can be operated at a constant speed of the drive machine in a variable-speed manner by a variable-speed differential drive equalizing a resulting speed difference. This variable-speed differential drive is generally a three-phase machine that is small compared to the drive machine and that is linked to an electrical system by means of a correspondingly small frequency converter.

Frequency converters are, however, more fault-susceptible than electrical machines and have a much shorter service life.

BRIEF SUMMARY OF THE INVENTION

Therefore, the object of the invention is to devise a device and a method of the initially-described type with which the drive train can be operated without frequency converters.

This object is achieved with a drive train.

This object is furthermore achieved in the case of a method for operating a drive train.

If the differential drive can be alternatively switched to an electrical system via a frequency converter and a line that is parallel to the frequency converter, the advantage according to the invention lies in that the drive train can be operated as is known in the art via a frequency converter, but even if the frequency converter has a defect or fails, the drive train can continue to be operated even if its speed variability stops or is limited.

Preferred embodiments of the invention are the subject matter of the dependent claims.

BRIEF DESCRIPTION OF THE DRAWINGS

Preferred embodiments of the invention are explained below with reference to the attached drawings. Here.

DETAILED DESCRIPTION OF THE PREFERRED EMBODIMENTS

Figure 1:
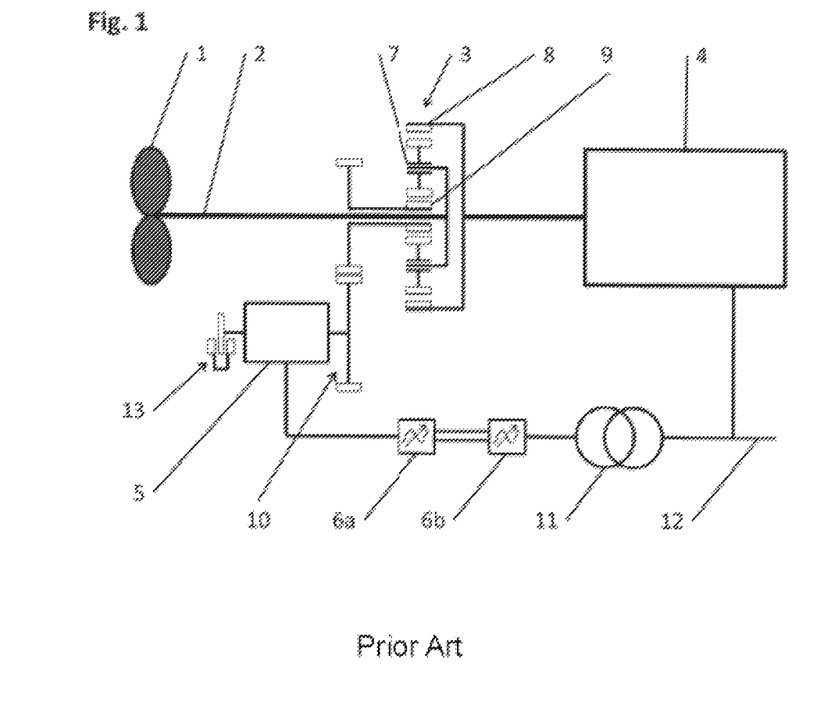
FIG. 1 shows the principle of a differential system for a drive of a pump according to the prior art.

FIG. 1 shows the principle of a differential system for a drive train in the example of a pump. Here, the driven machine 1 is the rotor of a pump, which is driven via a drive shaft 2 and a differential gear unit 3 by a drive machine 4. The drive machine 4 is preferably a medium-voltage three-phase machine, which is connected to an electrical system 12, which in the illustrated example is a medium-voltage electrical system based on a medium-voltage three-phase machine. The chosen voltage level, however, depends on the application and above all on the power level of the drive machine 4 and can, without having any effect on the basic operation of the system according to the invention, have any desired voltage level. According to the pole pair number of the drive machine 4, there is a model-specific operating speed range. The operating speed range is that speed range in which the drive machine 4 can deliver a defined or desired or necessary torque or in the case of an electrical drive machine can be synchronized with the electrical system 12. One planetary carrier 7 is connected to the drive shaft 2, one drive machine 4 is connected to an internal gear 8, and one sun wheel 9 of the differential gear unit 3 is connected to the differential drive 5. The heart of the differential system in this embodiment is thus a simple planetary gearing stage with three drives and outputs, one output being connected to the drive shaft 2 of the driven machine 1, a first drive being connected to the drive machine 4, and a second drive being connected to the differential drive 5.

The drive train thus consists essentially of a drive machine 4, differential gear unit 3, and differential drive 5.

In order to be able to optimally adapt the speed range of the differential drive 5, adaptive gearing 10 is implemented between the sun wheel 9 and the differential drive 5. Alternatively to the illustrated spur gear stage, the adaptive gearing 10 can, for example, also be multistage or can be designed as a toothed belt or chain drive and/or planetary stage or angle gearing. With the adaptive gearing 10, moreover, an axial offset for the differential drive 5 can be implemented that enables a simple embodiment of the differential drive 5 based on the coaxial arrangement of the driven machine 1 and the drive machine 4. A motor brake 13 that brakes the differential drive 5 if necessary is connected to the differential drive 5. Electrically, the differential drive 5 is linked to the electrical system 12 by means of a preferable low-voltage frequency converter, consisting of—depending on the operating mode as a motor or generator—a differential-drive-side rectifier or inverter 6a and an electrical-system-side inverter or rectifier 6b, and a transformer 11. The transformer equalizes possibly present voltage differences between the electrical system 12 and the electrical-system-side inverter or rectifier 6b and can be omitted when the voltage between the drive machine 4, the electrical-system-side inverter or rectifier 6b, and the electrical system 12 is the same. The rectifier or inverter 6a and the inverter or rectifier 6b are connected by a DC intermediate circuit and, if necessary, can be locally separated, preferably the differential-drive-side rectifier or inverter 6a being positioned as close as possible at the differential drive 5.

In order to achieve a high fault tolerance of the entire system, the frequency converter can also be made redundant, as proposed in, for example, WO 2012/001138 A.

An important advantage of a differential system is that the drive machine 4, if it is an electrical machine, can be linked directly to an electrical system 12, i.e., without power electronics. The equalization between variable rotor speed and fixed speed of the drive machine 4 joined to the electrical system is accomplished by the variable-speed differential drive 5.

The torque equation for the differential system is:

$$\text{torque}_{differential\ drive} = \text{torque}_{drive\ shaft} * y/x,$$

the size factor y/x being a measure of the gear ratios in the differential gear unit 3 and in the adaptive gearing 10. The power of the differential drive 5 is essentially proportional to the product of the percentage deviation of the pump speed from its base speed x drive shaft power. Accordingly, a large speed range fundamentally requires correspondingly large dimensioning of the differential drive 5. This is also the reason why differential systems are especially well suited to small speed ranges, but fundamentally any speed range being feasible.

Figure 2:
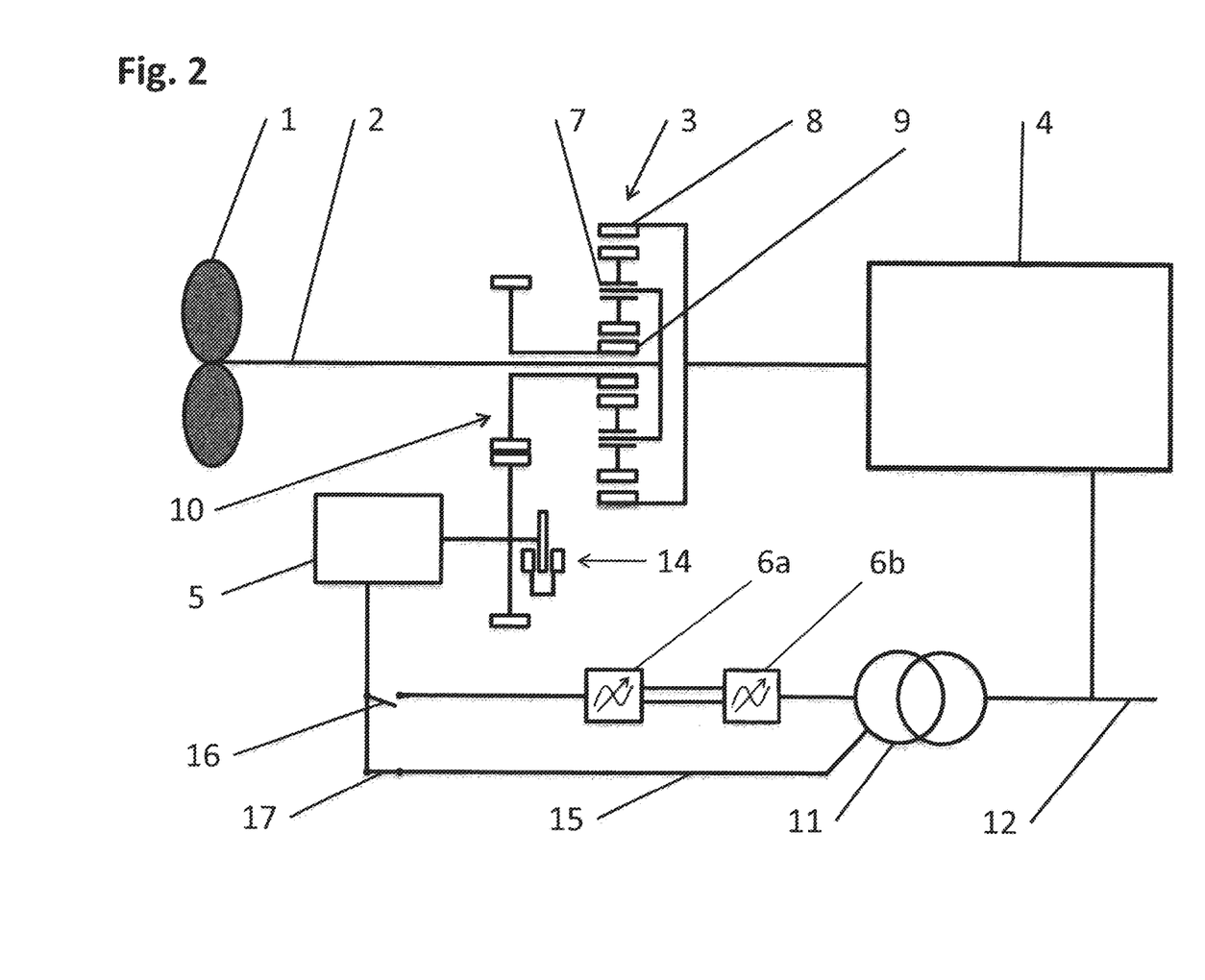
FIG. 2 shows a first embodiment of a differential system according to the invention.

FIG. 2 shows one embodiment of a differential system according to the invention. Here, the illustrated drive train, as in FIG. 1, also has a drive machine 4, a differential gear unit 3, a differential drive 5, and a frequency converter 6a, 6b that is connected to an electrical system 12 by means of a transformer 11. Here, a driven machine 1 is also driven by means of a drive shaft 2.

The transformer, if necessary, equalizes existing voltage differences between the electrical system 12 and the differential drive 5 and can be omitted when the voltage is the same.

Figure 4:
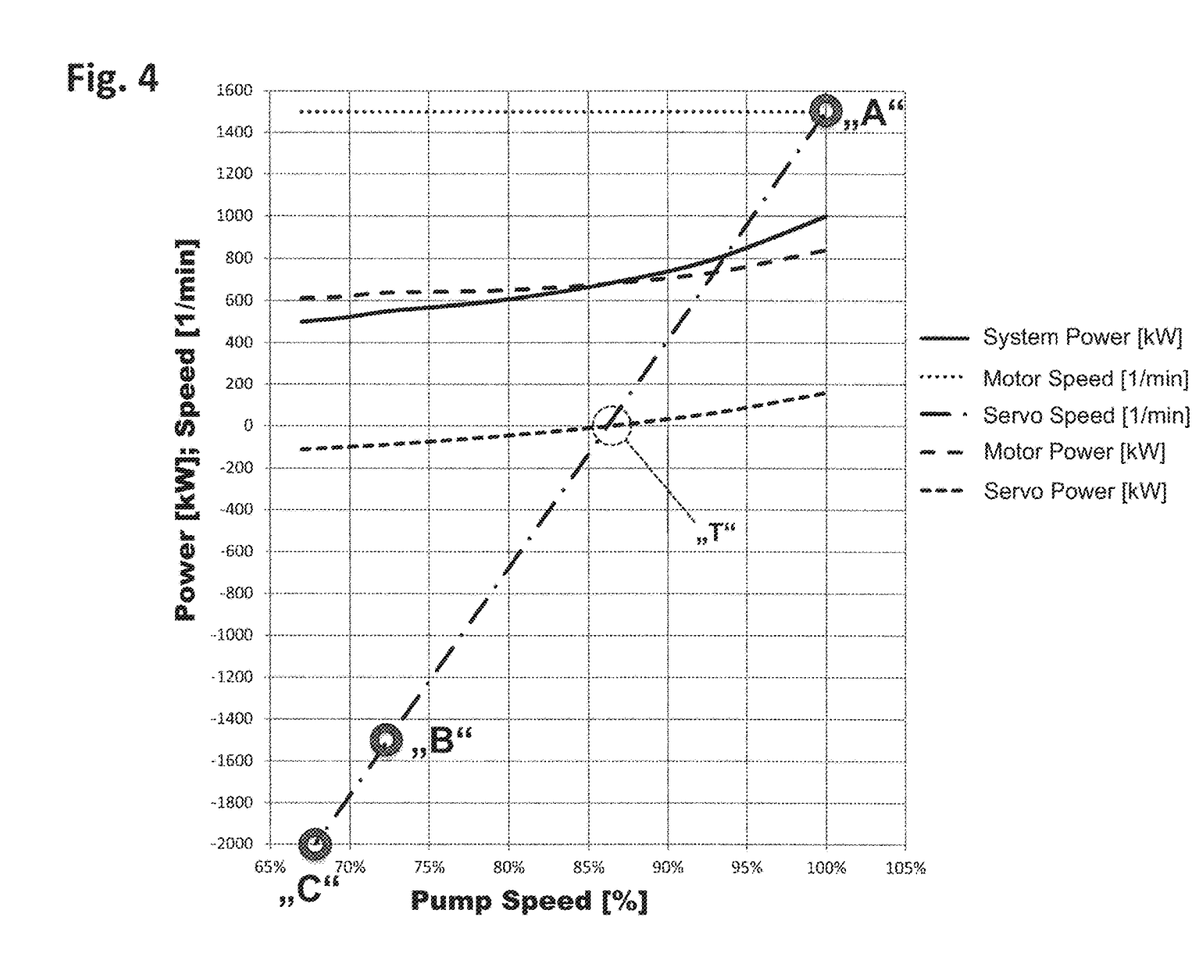
FIG. 4 shows the speed and power parameters of a differential system of a pump according to the invention.

The motor brake 14 in this version (alternatively to the position of the motor brake 13 in FIG. 1) is positioned between the differential drive 5 and the sun wheel 9. It is, for example, connected to a gear shaft of the adaptive gearing 10, but can be located according to the design requirements fundamentally anywhere between the sun wheel 9 and the differential drive 5. Thus, the differential drive 5 can be removed for a possibly necessary repair, and the differential system can still continue to be operated, at a base speed "T" (FIG. 4).

Alternatively to the engine brake 13 and/or 14, any type of a positive and/or non-positive locking or interlocking can be provided. This locking is provided either on a standard basis or is used as needed.

Frequency converters 6a, 6b, however, as already previously mentioned, are more fault-susceptible than electrical machines and have a much shorter service life. For this reason, for a plant operator, it is important to have a solution that enables continuation of operation as soon as a frequency converter is not (any longer) operational.

This object is achieved according to the invention in that in the case of a fault of the frequency converter 6a, 6b, it is disconnected from the differential drive 5, and the differential drive 5 is connected directly (or if necessary via a transformer 11) to the electrical system 12 via a line 15. To do this, there are two switches 16, 17 with which the differential drive 5 can be switched alternatively to the frequency converter 6a, 6b or to the line 15. Thus, at least one burst-proof operating point can be set.

If the differential drive 5 is designed as a pole-changing three-phase machine, at least two—but if necessary even several—synchronous speeds can be implemented by two or more electrically-disconnected windings being housed in the stator of the three-phase machine. Pairings of 4 and 6 or 4 and 8 poles are conventional. Thus, for example, in a 50-Hz electrical power system, a 4-pole three-phase machine has a synchronous speed of 1,500 1/min, a 6-pole three-phase machine has a synchronous speed of 1,000 1/min, and an 8-pole three-phase machine has a synchronous speed of 750 1/min.

I.e., two or more burst-proof operating points for the driven machine (1) can thus be realized according to an implemented pole-changing capacity. Even if the differential drive 5 cannot be pole-changed, however, the drive train can still continue to be operated at the (one) synchronous speed.

A further burst-proof operating point for the driven machine (1) is at base speed "T." This is the operating point at which the sun wheel (9) is, for example, when the brake 13, 14 is activated.

Figure 3:
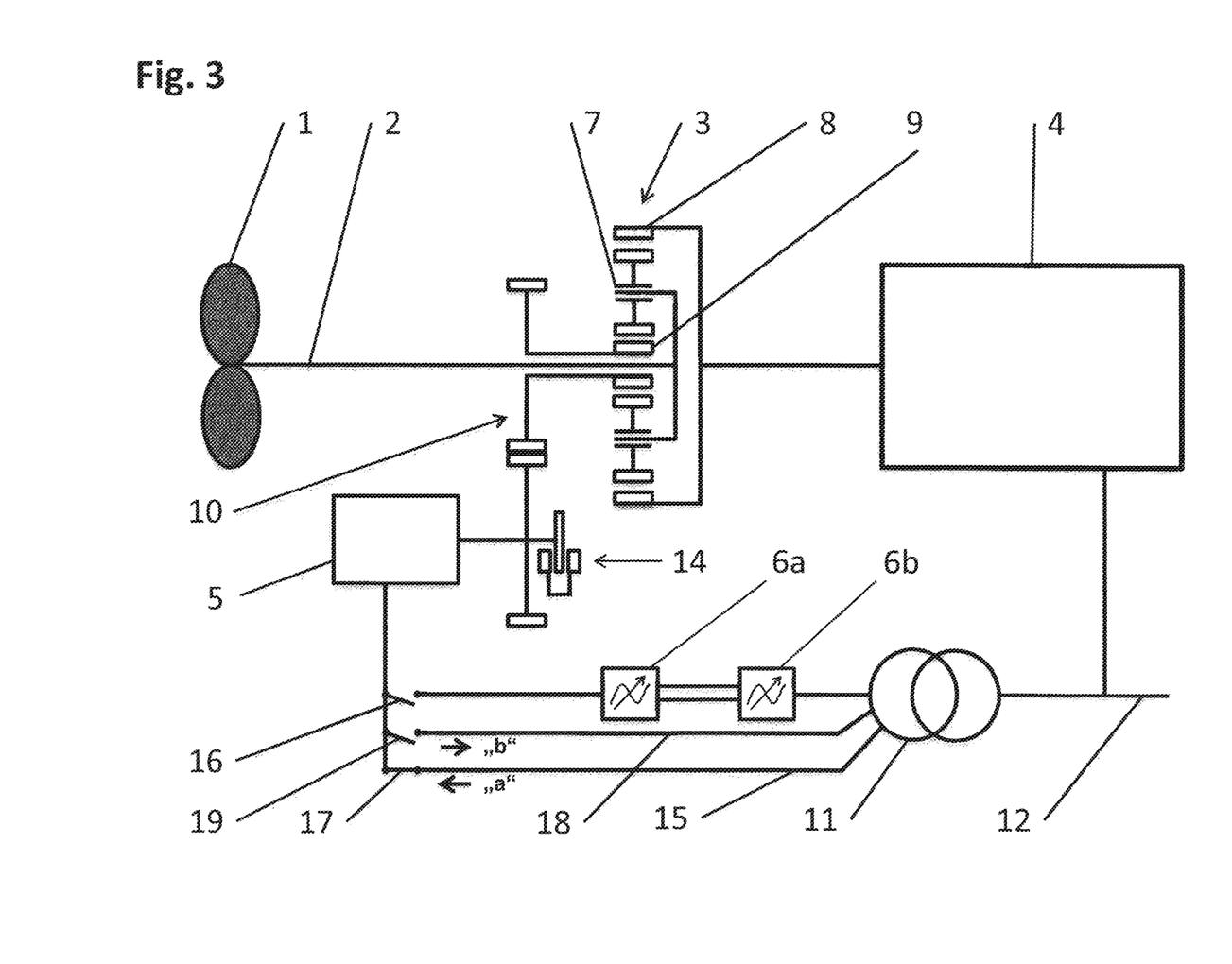
FIG. 3 shows another embodiment of a differential system according to the invention.

FIG. 3 shows another embodiment of a differential system according to the invention. Fundamentally, the differential system is built the same as shown in FIG. 2. In this system expansion according to the invention, the differential drive 5 that is designed as a three-phase machine can be connected to the electrical system 12 using a different rotating field direction.

To change the direction of rotation, the sense of rotation of the rotating stator field must be changed. During operation on the three-phase system, in this case the replacement of two external conductors, for example, the outside conductors L1 and L3, is sufficient. A conventional circuit for this purpose is the reversing circuit breaker.

In practical use, the motor terminals U2, V2 and W2 are bridged, and for a right-hand rotating field: switching of L1 to U1, L2 to V1, and L3 to W1, and for a left-hand rotating field: switching of L1 to W1, L2 to V1, and L3 to U1. By changing the rotating field, the differential drive 5 works either as a motor (power flow direction "a") or as a generator (power flow direction "b"). Thus, for the driven machine 1, there is another burst-proof operating point. If the three-phase machine can be pole-changed, accordingly more additional burst-proof operating points are obtained.

In the embodiment of FIG. 3 according to the invention, the line 15 symbolizes the rotating field with which the differential drive 5 turns into the motor range and thus the power flow direction "a" prevails. Another line 18 that can be connected to the differential drive 5 by means of the switch 19 symbolizes the rotating field, with which the differential drive 5 turns into the generator range and thus the power flow direction "b" prevails. In practice, of course, also only one of the two lines 15, 18 can exist, and to change the direction of rotation, for example, the external conductors can be interconnected as described.

I.e., in a differential system according to FIG. 3, at least three burst-proof operating points can be realized—using a pole-changing three-phase machine, at least 5. In a simplified embodiment of a differential system, the frequency converter 6a, 6b can be eliminated, and the driven machine 1 can be operated with several burst-proof operating points.

FIGS. 1 to 3 show a differential system in which the first drive is connected to an internal gear, the output is connected to a planetary carrier, and the second drive is connected to a sun wheel. In another variant according to the invention, the second drive can be connected to the planetary carrier 7, the first drive to the internal gear 8, and the output to the sun wheel 9. Other alternative combinations are likewise encompassed by the invention.

FIG. 4 shows the speed parameters and power parameters of a differential system according to the invention, for example for a pump. The figure shows power and speed values for a pump as a driven machine 1, a drive machine 4, and a differential drive 5 in each case plotted over the speed values of the drive shaft 2 ("pump speed"). The drive machine 4 is connected to the electrical system 12 and thus its speed ("motor speed") is constant—in the illustrated example, roughly 1,500 1/min for a four-pole three-phase machine in a 50-Hz electrical system. The working speed range for the drive shaft 2 is from 68% to 100%, 100% being the selected nominal and maximum point of the differential system. According to the gear ratio of the differential system, in this case the speed of the differential drive 5 ("servo speed") goes from −2,000 1/min to 1,500 1/min, the speed of roughly 1,500 1/min being the synchronous speed chosen for this example (in the illustrated example, likewise a 4-pole three-phase machine in the 50-Hz electrical system) of the differential drive 5. Roughly at this synchronous speed, the differential drive 5 delivers its nominal torque. The nominal torque in this case is the maximum torque that a three-phase machine can continually make available under given ambient conditions.

FIG. 4 shows that the differential drive 5 is operated in the generator (−) and motor (+) modes. Since the maximum required power of the differential drive 5 in the generator (−) range (roughly 110 kW) is less than that in the motor (+) range (roughly 160 kW), the differential drive 5 can be continually operated in the generator (−) range in the so-called field-weakening range, with which for the differential drive 5, a speed that is higher (being above its synchronous speed)—but with reduced torque—can be realized. Thus, the speed range for the driven machine 1 can be easily expanded up to the operating point "C." If the differential system is configured according to FIG. 3, by changing the rotating field, the working points "A" and "B" can be initiated. I.e., the differential system in the case of a direct linkage of the differential drive 5 to the electrical system 12 according to the invention (without frequency converters 6a, 6b—corresponds to an embodiment according to the invention as described in FIG. 3) can realize operating points over almost the entire operating speed range of the driven machine 1.

In one especially simple embodiment of a differential system, the frequency converter can be designed as a so-called 2Q system (2-quadrant frequency converter), as a result of which the differential system is then designed only for the motor (+) range. Thus, the electrical-system-side rectifier 6b can also be designed, for example, as a simple diode rectifier. In this design variant of a differential system, here the driven machine 1 in the case of a direct linkage of the differential drive 5 according to the invention to the electrical system 12 (without frequency converters 6a, 6b—corresponds to an embodiment according to the invention as described for FIG. 2) can also be operated both at its minimum point and also at its maximum point.

If the differential drive 5 is designed as a pole-changing three-phase machine, by corresponding switching-over of the pole pair number, speeds between minimum and maximum speed can also be realized.

The point "T" in FIG. 4 marks the so-called "base speed" of the drive shaft 2, at which the speed of the differential drive 5 is equal to zero. Ideally, this point "T" is placed in a working range in which the facility is operated over long time intervals. At this operating point, the motor brake 13, 14 can be activated, with which the differential drive 5 need not be operated, and subsequently losses and wear associated therewith are avoided. In the motor (+) range of the characteristics, the drive is driven in parallel by the drive machine 4 and the differential drive 5. The sum of the two powers is the drive power for the drive shaft 2 ("system power") minus accumulating system losses. In the generator (−) range, the drive machine 4 must compensate for the power of the differential drive 5 ("servo power"), as a result of which the total system power ("system power") is the drive power of the drive machine 4 ("motor power") minus the power of the differential drive 5. I.e., the motor (+) range is more efficient.

Fundamentally, it can be stated that the power flow via the differential drive 5 is smaller and thus the total system efficiency is higher, the closer the pump speed ("pump speed") is to the base speed "T." Since, as the pump speed increases, the required drive power also rises, compared to a drive according to the prior art, the required size of the drive machine 4 can, however, be reduced by the size of the differential drive 5 by the parallel driving of the drive machine 4 and of the differential drive 5.

The individual described measures for interlocking or for operating the differential drive 5 at the described operating points can, of course, be used either individually or in any combination with one another, so that depending on the application, at least one operating point—but also any number of operating points—for the drive train, can be realized even if the frequency converter or even the differential drive is shut shown.

During operation of the drive train, it is also possible to change between the described operating points with which variable-speed operation becomes possible. At these operating points, the differential drive 5, if it is in operation, is operated in each case at different speeds that are, however, synchronous speeds, since the differential drive is connected directly or optionally only via the transformer 11 to the electrical system 12.

By way of example, a pump is shown symbolically as a driven machine 1 in FIGS. 1 to 3. The concept described here can, however, also be used in drives for all other types of driven machines, such as, for example, compressors, fans, and conveyor belts, mills, crushers, etc., or energy extraction facilities and the like.

In the case of using the system according to the invention in an energy extraction facility, the drive machine 4 works essentially in generator operation, and accordingly the power flow in the entire drive train is rotated.

If the differential system according to the invention is run up with a differential drive 5 that can be directly (without frequency converters 6a, 6b) connected to the electrical system 12, preferably first the drive machine 4 is switched to the electrical system, while the second drive (sun shaft 9 or differential drive 5) preferably remains braked by means of the operating brake 13, 14 or by means of locking. Thus, the driven machine 1 reaches the operating point "T." Then, the differential system is operated either at this operating point or the differential drive 5 is switched to the electrical system. In doing so, subsequently on the differential drive 5, the speed is set that arises by the chosen/preset rotating field direction or pole pair number on the differential drive 5. The operating point that is subsequently set for the driven machine 1 arises according to the rotating field direction or pole pair number chosen for the differential drive 5 and the gear ratios of the differential gear unit 3 and the adaptive gearing stage 10.

However, the system can, of course, also be run up in some other way, for example by the drive machine 4 and the differential drive 5 being switched at the same time to the electrical system or by first the differential drive 5 and then the drive machine 4 being switched to the electrical system. In, for example, non-electrical drive machines, the differential drive 5 can likewise be connected before, at the same time with, and after the drive machine.

The driven machine 1 cannot be continuously operated in a variable-speed manner in this configuration, i.e. without frequency converters. When the driven machine 1 is, for example, a conveyor apparatus in a line system, there can be a choke or a flap or a bypass or a valve in the line system after the driven machine 1. Thus, optionally the flow rate can be adjusted between the fixed flow rates or delivery heads that are also set based on fixed speeds of the differential system.

For high facility availability, it is a major advantage to be able to continue to operate the entire system without interruption when the frequency converter 6a, 6b fails. In doing so, however, the following boundary conditions must be observed:

This is, on the one hand, the system behavior, mainly in the system-operating range between the operating points "B" and "C," in which the differential drive 5 works in the generator mode (-) at high speed. If the frequency converter 6a, 6b fails in this operating range, the differential drive 5 is instantly accelerated and runs the risk of reaching a damaging overspeed range.

This can be prevented with the drive system according to the invention by preferably the brake 13, 14 or any other deceleration device acting on the speed of the second drive being activated so quickly that the deceleration device does not unconditionally shut down the second drive, but prevents a system-damaging overspeed of the second drive of the differential system or of the differential drive 5.

If it is desired to initiate the operating point "T," the second drive of the differential drive is braked.

If one of the operating points "B" or "A" is to be initiated, in another, preferably parallel step, the differential drive 5 is directly connected to the electrical system 12. If this takes place quickly enough, activation of one of the above-described deceleration devices can be omitted. If, moreover, the possibility of initiating the operating point "B" is omitted, one, for example, reversing circuit breaker is saved, and likewise either preferably the operating point "T" or alternatively the operating point "A" is initiated by the differential drive 5 being connected to the electrical system 12 in the sense of rotation of the stator rotating field necessary for this purpose.

If the operating point "B" is to be initiated, the deceleration apparatus can also be used for speed-controlled electrical-system synchronization of the differential drive 5, by the deceleration apparatus being activated such that on the differential drive 5, essentially its synchronous speed is set before it is connected to the electrical system 12.

With a deceleration apparatus, fundamentally continuous variable-speed operation in the system-operating range between the operating points "C" and "T" can also be implemented. This is a good idea, for example, when the differential drive 5 fails, or the power of the differential drive 5 or of the inverter 6a, 6b is not sufficient to make available a required operating torque.

Figure 5:
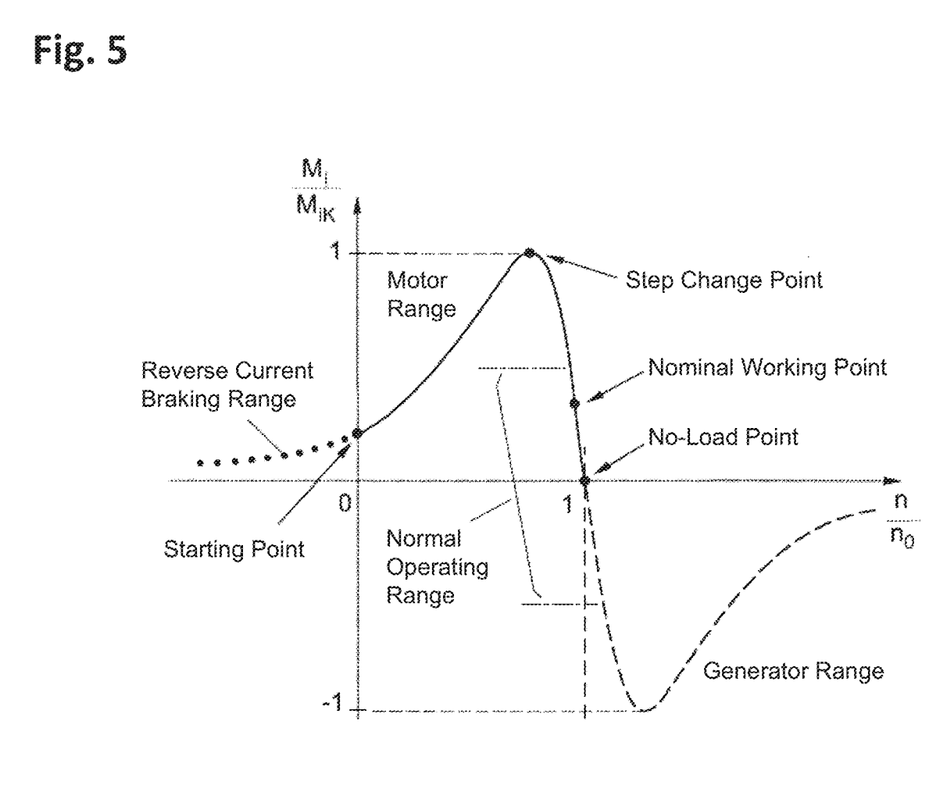
FIG. 5 shows a characteristic curve of a three-phase machine.

FIG. 5 shows a characteristic curve of a three-phase machine (which can be used, for example, as a differential drive 5) in which the rotating field is connected to an electrical system such that according to the invention in accordance with FIG. 4, the operating point "A" (in FIG. 5, "nominal working point" of the three-phase machine) would be set. In the system-operating range between points "C" and "T," the three-phase machine in this case would move along the dotted part of the characteristic curve ("reverse-current braking range"). It can be recognized from the depiction in FIG. 5 that the torque ($M_i/M_{iK}$) that can be typically implemented by a three-phase machine in the reverse-current braking range is much smaller than its nominal torque. The torque in the reverse-current braking range can, however, be increased by, for example, a special design of the rotor bars of the three-phase machine. If this should not be sufficient to adjust the differential system to a desired burst-proof operating point, preferably in addition a deceleration apparatus, for example, an already-described brake, is activated. This is also preferred if the differential drive 5 when the frequency converter 6a, 6b fails in the system-operating range above "T" (motor (+) range) comes into the generator (−) range of the characteristic diagrams according to FIG. 4. The deceleration apparatus is activated in both cases preferably until, on the one hand, the differential drive 5 is connected directly to the electrical system and, on the other hand, the system-operating speed moves in the generator (−) range of the characteristic diagram (≤"T").

Possible operating points with a reduced output of the driven machine 1 between the burst-proof operating points that can be implemented without frequency converters 6a, 6b at fixed speed are adjusted with a choke apparatus. This choke apparatus can be, for example, a choke, a flap, a bypass, or a valve, which can be positioned, for example, in the line system downstream from the driven machine 1. If the driven machine 1 is, for example, a mechanical drive, the choke apparatus can be, for example, a brake, a retarder, or the like, in order to reduce the power of the drive machine 1.

In this case, however, only operating points "underneath" (in the direction of lower speed or delivery amount or power) of the respective burst-proof (fixed) operating point can be initiated. In order to implement the entire operating range of the system with optimum efficiency, according to the invention variation is possible between the fixed-speed points according to operating requirements. In order to operate the overall system with optimum efficiency, with the differential drive 5, preferably always the next higher (in the direction of higher speed or delivery amount) burst-proof operating point ("B", "T" or "A") is set, and an underlying operating point is initiated by means of the choke apparatus.

In one preferred embodiment according to the invention, in any case for adjustment of flow rate and delivery head required for purposes of operation, there is alternation between the burst-proof operating points "A", "T" and "B," without the need to use a choke apparatus.

If, at the instant of failure of the frequency converter 6a, 6b, the system is at an operating point between "B" and "T," the differential drive 5 is preferably switched either directly onto the electrical system 12 so that the operating point "A"

is initiated, or by braking of the second drive of the differential system, the operating point "T" is set.

If, at the instant of failure of the frequency converter 6a, 6b, the system is at an operating point between "T" and "A," the differential drive 5 is preferably switched directly onto the electrical system 12 such that the operating point "A" is initiated directly without a deceleration apparatus of the second drive of the differential system having to be activated (to the extent, as described above, the system-operating speed, for example, does not drop below "T").

The described adjustment concept with the burst-proof operating points "A", "T" and "B" can also be expanded according to the invention to systems with a pole-changing differential drive 5, as a result of which a correspondingly larger number of burst-proof operating points arises, between which then it is possible to switch over in an operationally-optimum manner.

The invention claimed is:

1. A method for operating a drive train with a drive shaft, a drive machine, and a differential gear unit with three drives and outputs, one output being connected to the drive shaft, a first drive being connected to the drive machine, and a second drive being connected to an electrical differential drive, the electrical differential drive configured to be connected to an electrical system via a frequency converter, the method comprising:
    operating the drive machine while the electrical differential drive is connected to the electrical system via the frequency converter;
    operating the drive machine at a first burst-proof operating point;
    operating the differential drive at a synchronous speed, while the differential drive is connected directly or only via a transformer to the electrical system; and
    operating the drive machine at a next higher burst-proof operating point when the frequency converter fails.

2. The method according to claim 1, wherein the differential drive is alternatively switched to the electrical system via the frequency converter and a line that is parallel to the frequency converter.

3. The method according to claim 2, wherein the differential drive is switched via the line onto the electrical system when the frequency converter has a defect.

4. The method according to claim 1, wherein the drive machine is operated by the differential drive at one or more of the first burst-proof operating point and the next higher burst-proof operating point.

5. The method according to claim 1, wherein the drive machine is operated by turning the rotating field direction of the differential drive at one or more of the first burst-proof operating point and the next higher burst-proof operating point.

6. The method according to claim 1, wherein the drive machine is operated by the differential drive at the first burst-proof operating point and the next higher burst-proof operating point, and during operation, there is a change between the operating points.

7. The method according to claim 1, wherein the output of the drive machine is reduced in operation at the first burst-proof operating point by a choke apparatus.

8. A method for operating a drive train with a drive shaft, a drive machine, and a differential gear unit with three drives and outputs, one output being connected to the drive shaft, a first drive being connected to the drive machine, and a second drive being connected to an electrical differential drive, the electrical differential drive being configured to be connected to an electrical system via a frequency converter, the method comprising:
    operating the drive machine at a burst-proof operating point with a base speed when the second drive of the differential gear unit is at rest; and
    when the frequency converter fails and the drive machine is being operated below the base speed, braking the second drive by a deceleration apparatus that acts on the second drive.

9. The method according to claim 8, wherein when the frequency converter fails, while the differential drive is being operated below the base speed, the deceleration apparatus is activated until the next higher burst-proof operating point or one of the next higher burst-proof operating points is reached, but at maximum up to the base speed.

* * * * *